(12) United States Patent
Torres Martinez

(10) Patent No.: US 8,038,825 B2
(45) Date of Patent: Oct. 18, 2011

(54) FIBRE STRIP APPLICATION HEADS

(76) Inventor: Manuel Torres Martinez, Pamplona (ES)

( * ) Notice: Subject to any disclaimer, the term of this patent is extended or adjusted under 35 U.S.C. 154(b) by 475 days.

(21) Appl. No.: 12/285,400

(22) Filed: Oct. 3, 2008

(65) Prior Publication Data

US 2009/0090804 A1    Apr. 9, 2009

(30) Foreign Application Priority Data

Oct. 8, 2007    (ES) .................. 200702632

(51) Int. Cl.
B32B 37/00    (2006.01)
B32B 37/15    (2006.01)
B32B 38/00    (2006.01)
B32B 38/04    (2006.01)
B32B 38/18    (2006.01)
B32B 38/08    (2006.01)

(52) U.S. Cl. ........ 156/252; 156/250; 156/253; 156/256; 156/510; 156/516; 156/517

(58) Field of Classification Search .................. 156/250, 156/252, 253, 256, 510, 516, 517
See application file for complete search history.

(56) References Cited

U.S. PATENT DOCUMENTS

| 4,696,707 | A | * | 9/1987 | Lewis et al. ..................... 156/64 |
| 5,110,395 | A |   | 5/1992 | Vaniglia |
| 5,472,553 | A | * | 12/1995 | Roberts ......................... 156/353 |
| 6,968,883 | B2 | * | 11/2005 | Torres Martinez ........... 156/433 |

FOREIGN PATENT DOCUMENTS

| ES | 2 212 878 A1 | 8/2004 |
| ES | 2 246 713 A1 | 2/2006 |

* cited by examiner

*Primary Examiner* — Mark A Osele
*Assistant Examiner* — Christopher C Caillouet
(74) *Attorney, Agent, or Firm* — The Nath Law Group; Jerald L. Meyer; Stanley N. Protigal

(57) ABSTRACT

The invention relates to improvements in fiber strip application heads for applying fiber strips (4) that are supplied with a support and protection paper (5), the fiber strip (4) to be applied being supplied with the immediate separation of the protection paper (5) at the exit from the feed reel (1), such that the fiber strip (4) circulates by itself through the head, passing through drive modules (10) formed by caterpillar strips, with the passage through a longitudinal cutting module (20) and through a waste separation module (22) in the path towards the application area.

7 Claims, 11 Drawing Sheets

FIBRE STRIP APPLICATION HEADS

FIELD OF THE INVENTION

The present invention relates to the formation of parts by means of synthetic fibre strips, such as fibreglass or carbon fibre, proposing a head for the application of the mentioned strips, in which improvements allowing the development of the functional activity in a more advantageous manner have been provided.

STATE OF THE ART

In recent years, concern about the degree of productivity of industrial processes has been constant, which translates into the search for more productive, reliable and automatic systems, in all types of industries.

The systems for forming parts with synthetic fibres, as is already usual in the aeronautical and other similar industries, generally have a large amount of events which require stopping the machines throughout the fibre strip application process, as in the heel-compacting roller changes, cuts at 0°, certain geometries of the cuts, etc.

Some of the negative effects of said stops can be minimized by means of strategies such as using simpler cuts, overlapping some operations with others, etc., which nevertheless still means small improvements at the quantitative level, but not at the qualitative level, since the main concepts of the taping process remain unchanged.

In addition, in fibre strip application processes, the strips are supplied with a support paper that is adhered to them and on which the strip is kept until the point of application is near, which is where the paper is separated from the strip, in order for the paper to be collected in a rewinding, while the fibre strip goes to the application area.

Said journey of the strips attached to the corresponding support paper, virtually until the application area, involves a drawback for carrying out the cuttings that may be necessary on the strip, since the cuts only have to be made on the fibre strip material, respecting the support paper, which demands reducing the circulation speed of the strip, or completely stopping it while the cuts are made, and the rotational cutting systems that are known in applications of narrow fibre strips that are supplied without support paper cannot be used for said cuts, as in the case of Patent ES 2212878 of the same applicant as the present invention, because of the lack of accuracy of these systems for cutting the fibre material respecting the support paper.

Another drawback of known fibre strip application systems is that to remove the excess cuttings of the fibre material that result from the cuts, the application head has to be moved to a collector in which the mentioned cuttings are deposited, which involves downtimes in the application process that reduce production.

OBJECT OF THE INVENTION

According to the invention, improvements in the constructive and functional embodiment of the fibre strip application heads are proposed, such that a system is achieved that improves the efficiency of the strip application process, minimizing the events causing the reduction of the productivity of said process.

According to the invention, the strips to be applied are supplied from an assembly comprising an unwinder for the fibre strip associated to the support paper, and a rewinder in which the support paper is immediately collected at the exit from the unwinder, such that the fibre strip is separated from the support paper right at the exit from the supply assembly, the fibre strip passing alone, without the paper support, in the entire path through the head.

In the circulation through the head, the fibre strip passes through a rocker controlling the tension, passing through drive modules that are formed by caterpillar strips having a drive actuation with a programmed speed and which rotates freely when the movement of the fibre strip exceeds the programmed speed.

In the path through the head, the fibre strip also passes through a longitudinal cutting module and through a differential cutting system, the former acting by means of blades driven by ultrasound, to make the necessary longitudinal cuts on the strip; whereas the differential cutting system consists of two rotational cutting units, each of which is formed by a roller in which there is incorporated a series of blades projecting radially on the periphery, each blade being arranged on a rotating support which allows orienting the blade, whereas the supports of the different blades are arranged on the bearing roller according to an independent rotating assembly, synchronized with the movement of the fibre strip.

The blades of the mentioned units of the differential cutting system have an arched front edge and act in combination with dollies in the form of ribbed rollers, which allows making transverse and inclined cuts keeping the depth of the incision constant while making the cuts.

The blades of the two units of the differential cutting system are also arranged according to a staggered distribution in relation to one another, such that partial cuts overlapping one other are made by means of the two units, allowing to determine continuous cutting lines on the fibre strips, and cutting lines in a transverse or inclined direction can be made by means of combining the orientation of the blades with the individual rotating movement of each of them on the bearing roller.

After the cutting area, in relation to the path of the fibre strip there is also a waste separation module formed by a collecting box and a roller provided with flanges that can be located in a projecting or retracted manner with respect to a radial position, by means of which the deviation of the excess pieces of the fibre strip towards the collecting box is determined, thus achieving the removal of said excess pieces in the actual circulation of the fibre strip towards the application area, without having to alter the movement of the strip and therefore the production of the application taping.

The improvements in the invention therefore have truly advantageous characteristics, their implementation in fibre strip application heads acquiring their own identity and a preferred character with respect to conventional heads with the same function.

DETAILED DESCRIPTION OF THE INVENTION

The object of the invention relates to particularities that are included in the structural embodiment of the synthetic fibre strip application heads to form parts of these materials, such that with these particularities advantageous qualities of productivity and flexibility are obtained in the functional process of the mentioned fibre strips.

Figure 1:
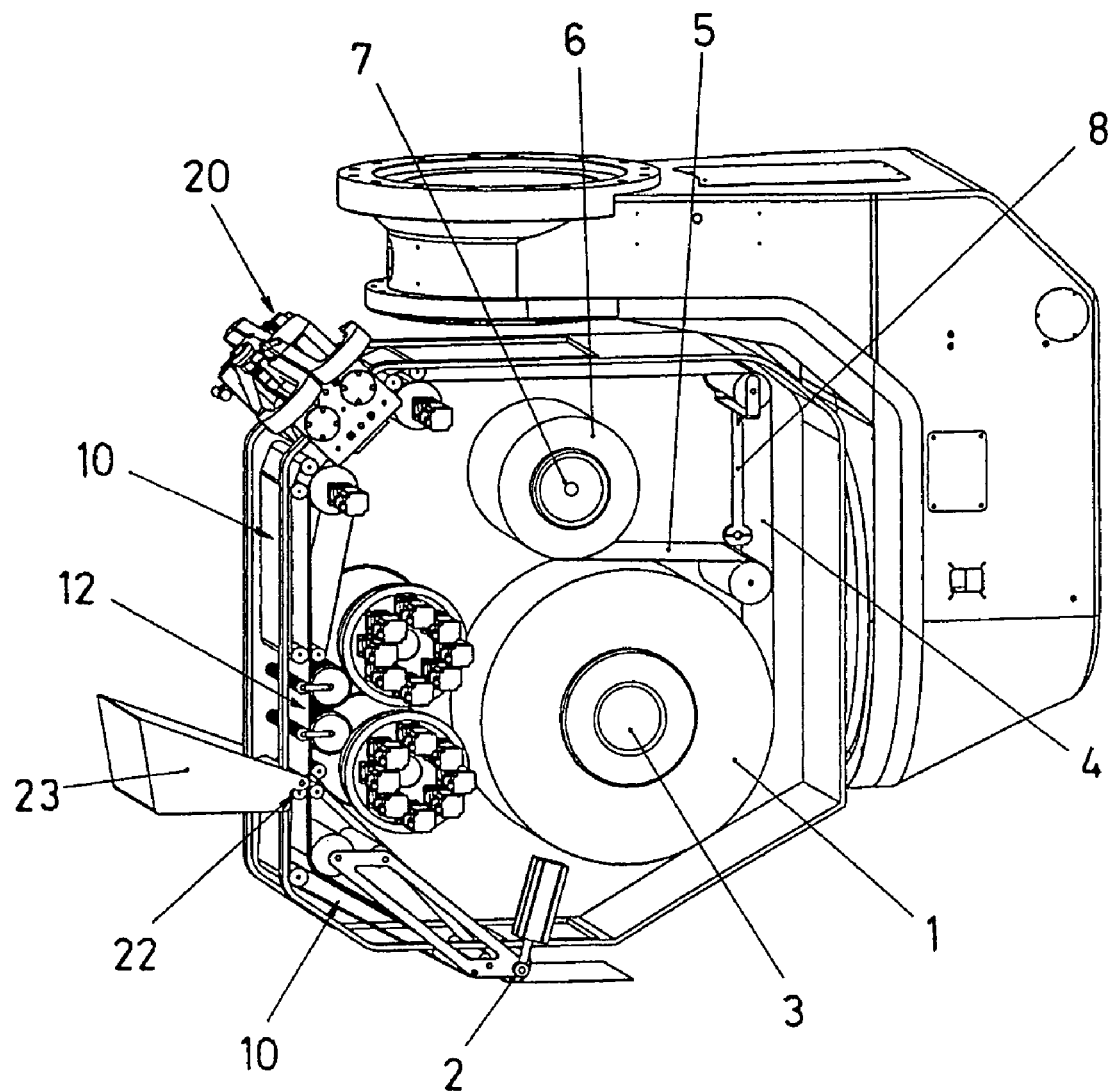
FIG. 1 shows a perspective view of a fibre strip application head according to the invention.
Figure 2:
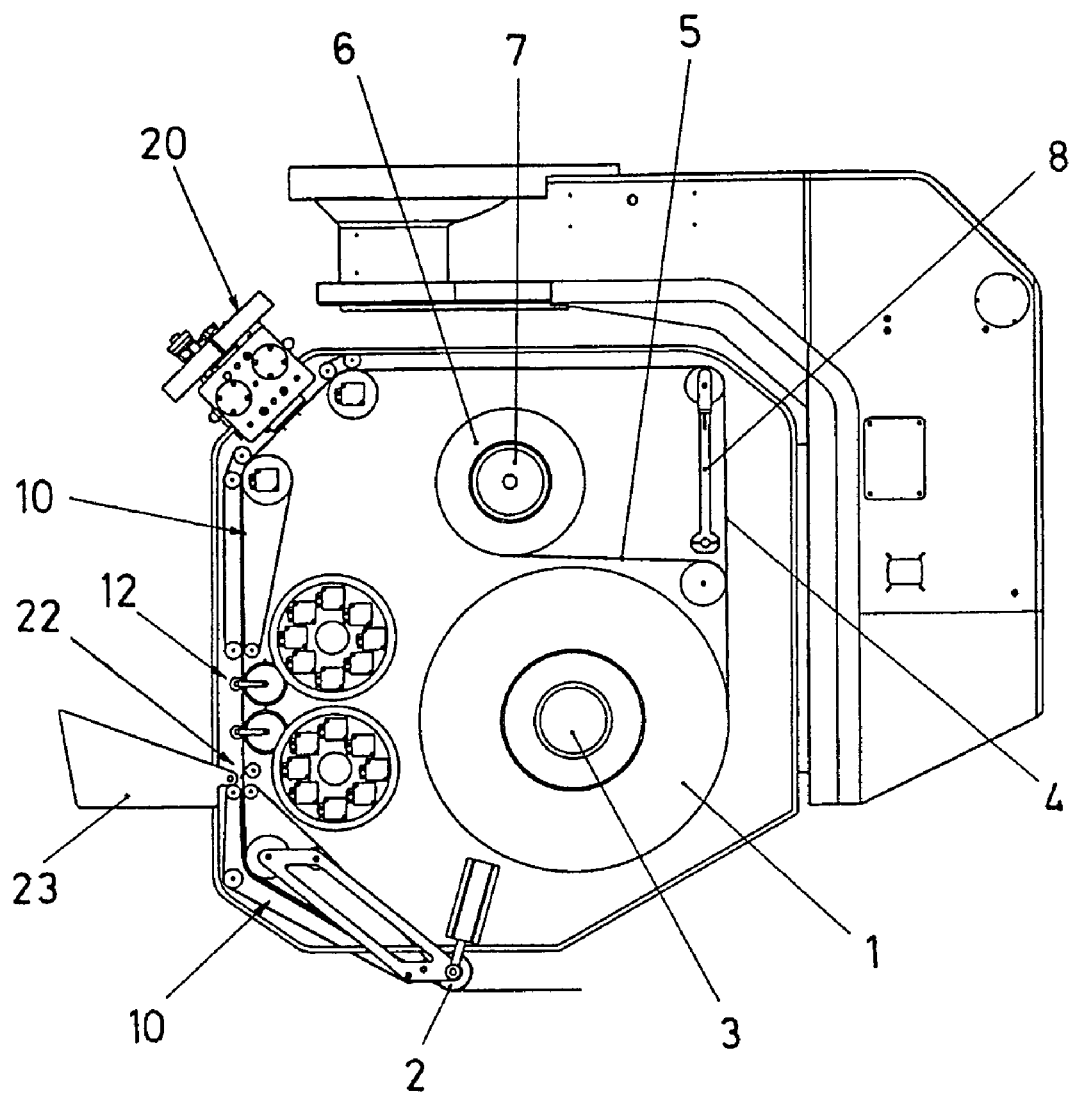
FIG. 2 is a front view of said head of the previous figure.

According to the invention, in a fibre strip applicator head (FIGS. 1 and 2), the strip to be applied is supplied from a feed reel (1), passing in a path through the head to an area in which a compacting roller (2) presses it on the application surface.

The reel (1) supplying the strips is incorporated into an unwinding shaft (3), the strip (4) of fibre material coming out accompanied by the corresponding support and protection paper (5) with which it is rolled on the reel (1), such that immediately at the exit from the unwinding the strip (4) of fibre material is separated from the paper (5), the latter being collected in a reel (6) that is arranged in a rewinding shaft (7).

In the event that the strip (4) of fibre material were provided with protection on the two faces, i.e., the paper (5) on one face and a plastic film on the other face, the rewinding shaft (7) for collecting the paper (5) would be on one side of the passage for unwinding the strip (4) and another rewinding shaft for collecting the plastic film would be on the other side.

Figure 3:
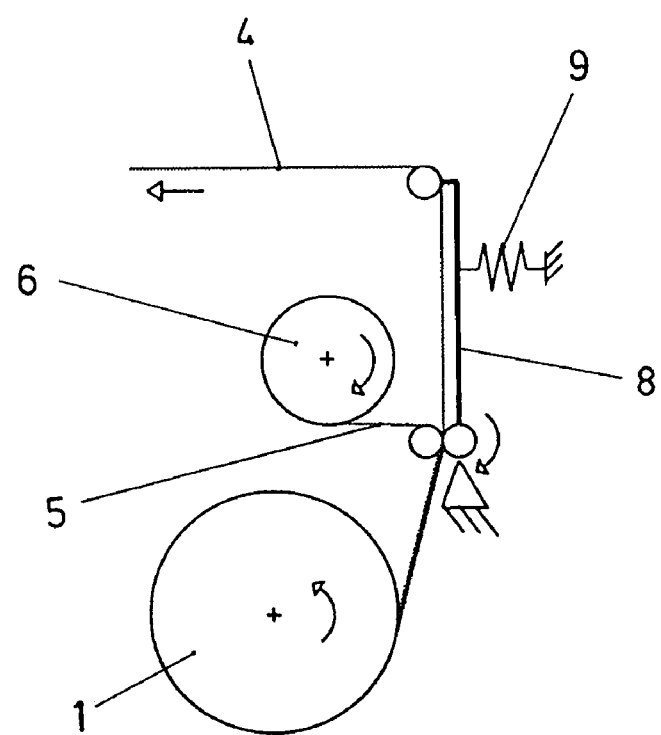
FIG. 3 is a diagram of the supply assembly for supplying the strip to be applied, according to the invention.
Figure 4:
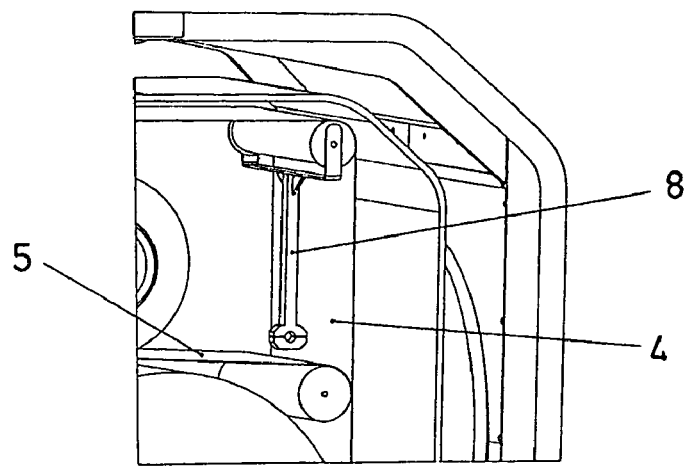
FIGS. 4 and 5 are two details of the exit of the fibre strip from the supply assembly with the tension rocker in two different respective positions.
Figure 5:
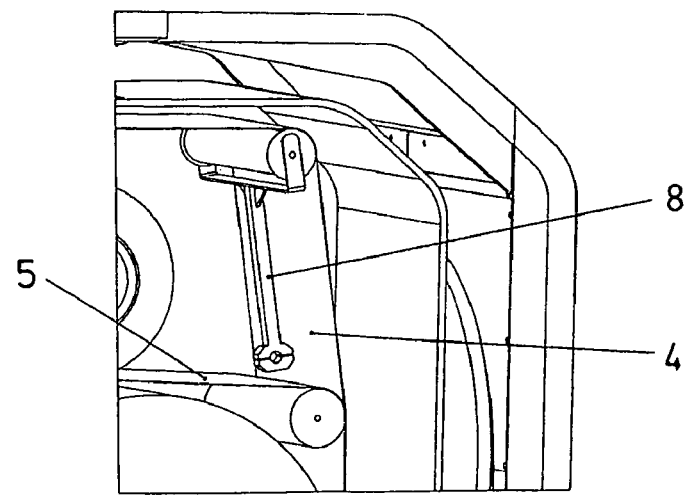

At the exit from the unwinding, the fibre strip (4) passes through a rocker (8) which, as shown in the diagram of FIG. 3, controls of the tension of the strip (4), exerting a force on it by actuating a spring (9) adjusted to the work tension, said spring (9) being able to be any type of mechanical, electrical, pneumatic device etc. which can provide a constant tension.

The adjustment of the tension of the strip (4) can be varied by means of instructions of the work process of the application head, said tension therefore being a programmable value, the speed command of the unwinding shaft (3) being established by means of a simple closed-loop control of the position of the rocker (8), which ensures the maintenance of unwinding tension of the strip (4) in the entire range of work speeds and accelerations.

Figure 6:
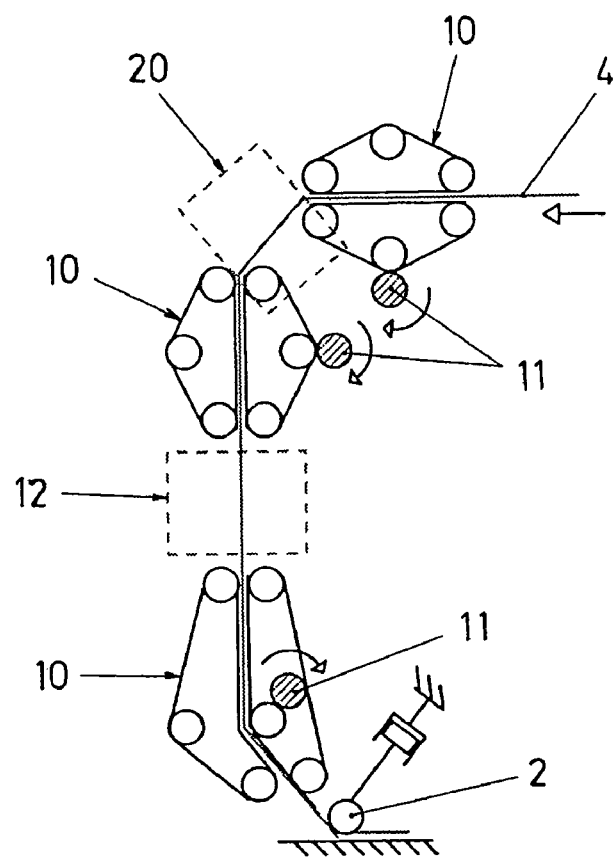
FIG. 6 is a diagram of the leading of the fibre strips towards the application area.

From the supply unwinding, the fibre strip (4) therefore circulates alone, without the support paper (5), a system that can lead said fibre strip (5) to the application area being necessary, for which the passage is arranged, as shown in the diagram of FIG. 6, through drive modules (10) formed by caterpillar strips actuated by drive rollers (11) rotating at a programmed speed, but such that at the moment that the fibre strip (4) exceeds the speed of said modules (10), the drive thereof does not put up resistance, moving freely at the same time as the strip (4).

To ensure that the drive speed of all the modules (10) on the strip (4) is the same, the drive transmission of the rollers (11) of said modules (10) is a single transmission.

With this arrangement the system can work:

In an interpolated mode, in which the fibre strip (4) is supplied by means of the drive modules (10) in an interpolated mode with the movement of the application head, such that if there are inaccuracies causing a deviation to occur between the amount of strip (4) that must be supplied and the actual amount demanded by the speed of the application, the latter being greater, the drive modules (10) start working, preventing a sudden increase in the tension of the strip (4).

In a controlled tension mode, in which the drive modules (10) are stopped and the strip (4) is supplied as required by the progress of the application head, the application being carried out according to the tension programmed in the rocker (8).

The change from one operation mode to another is instantaneous and can be carried out without needing to stop the work process or reduce the application speed of the fibre strip (4).

In the course of circulating through the applicator head, the fibre strip (4) passes through a differential cutting system (12) formed by two rotational cutting units acting consecutively, each of said units being formed by a series of blades (13) that are arranged in a rotating assembly capable of accompanying the fibre strip (4) in its movement, during the action of the cuts.

Figure 10:
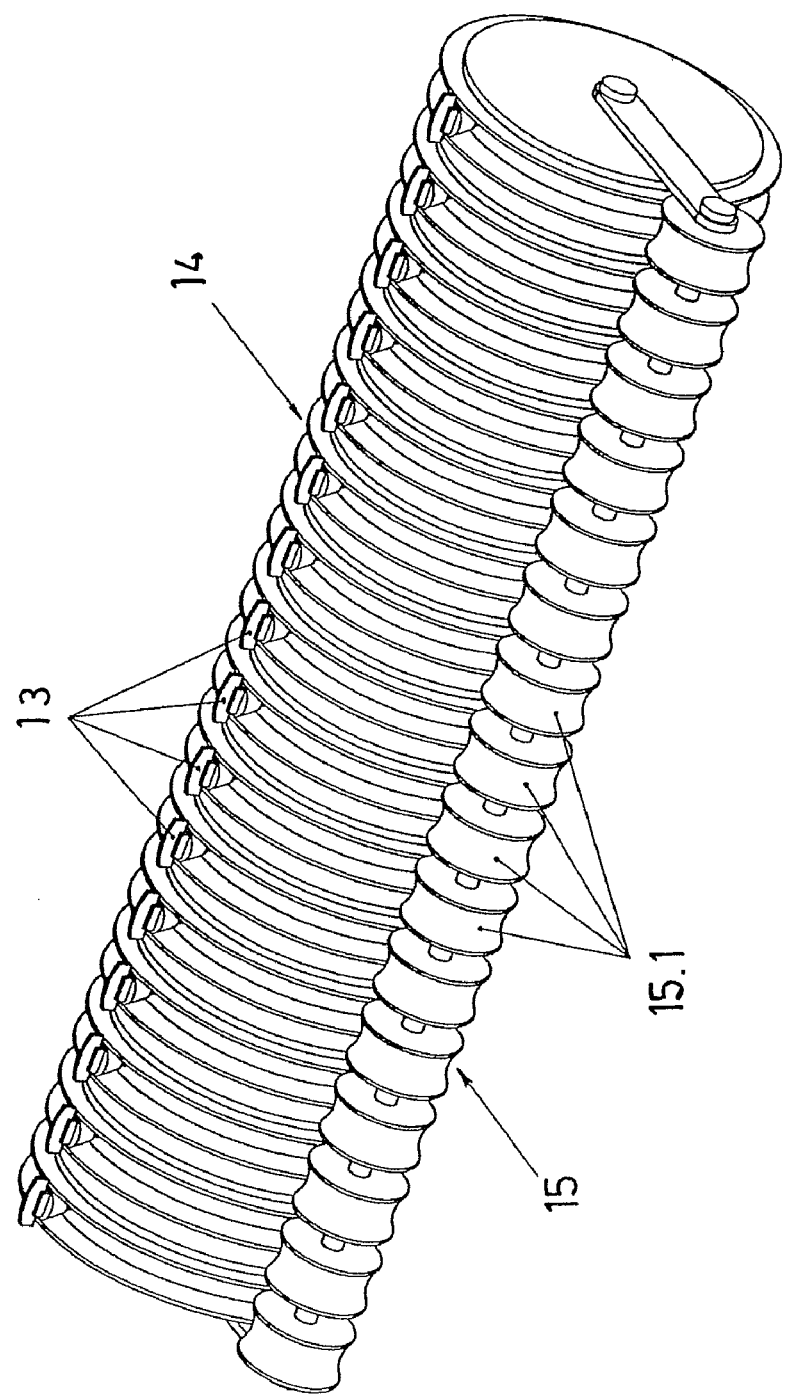
FIG. 10 is an enlarged perspective view of the assembly of a rotational cutting unit according to the invention.

Each of the mentioned cutting units is formed by a roller (14), in which the respective blades (14) are incorporated such that they project radially, as is observed in FIG. 10, a dolly (15) being arranged in relation to the assembly of the blades (13), which dolly is formed by corresponding ribbed rollers (15.1) opposing the different blades (13).

Figure 8:
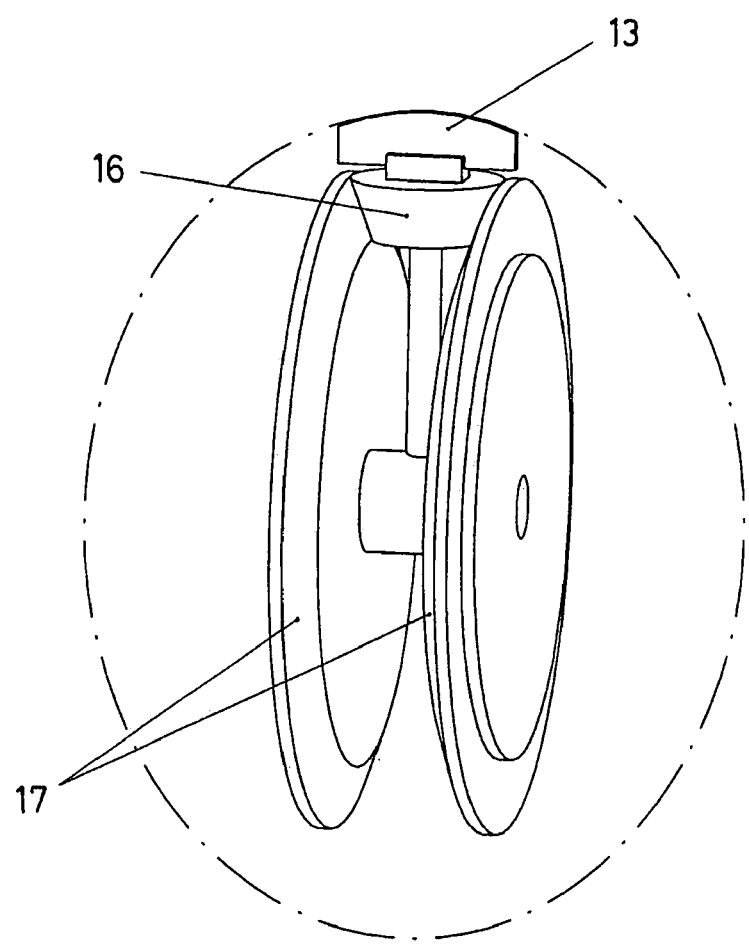
FIG. 8 is a perspective view of the assembly for supporting and driving a blade of the differential cutting system according to the invention.
Figure 9:
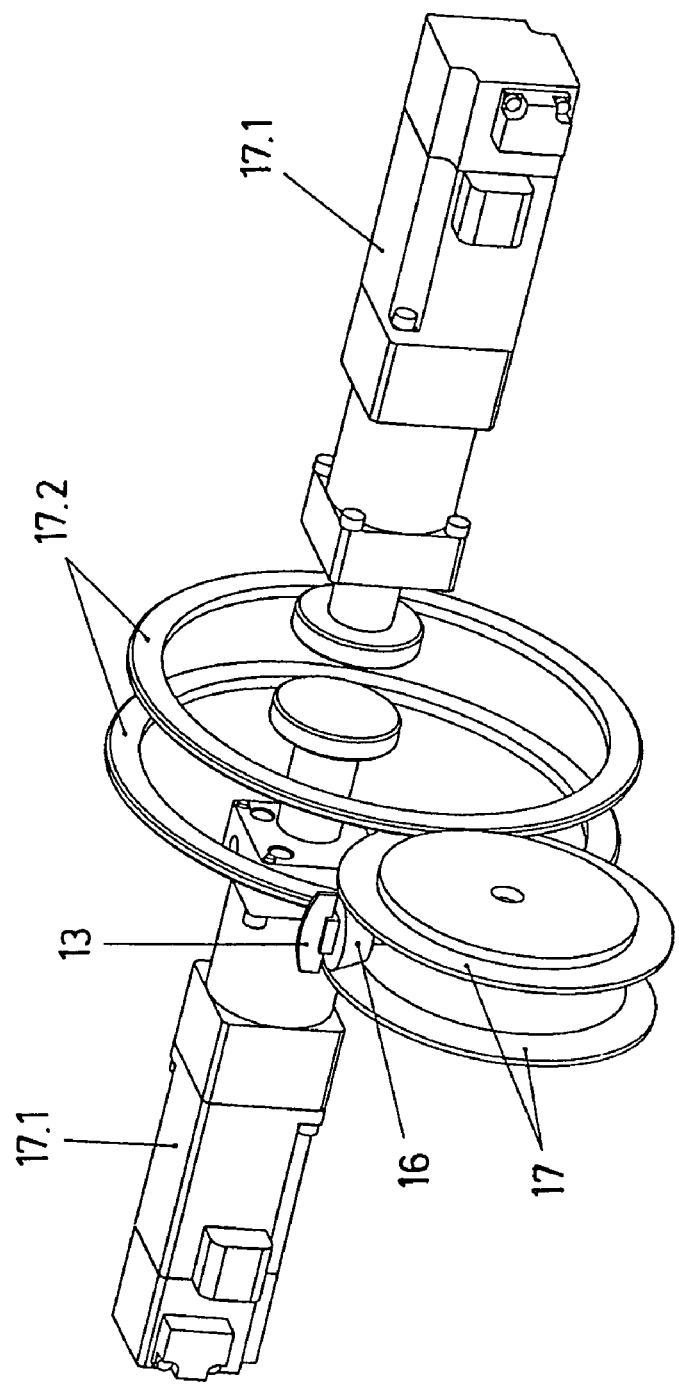
FIG. 9 is a perspective view of the system for driving the crown gears of the assembly of the previous figure.

Each blade (13) is arranged (FIGS. 8 and 9) on a support (16) in the form of a bevel pinion which is geared with two opposed bevel crown gears (17), which are actuated independently by respective motors (17.1) through respective transmission pinions (17.2), as is observed in FIG. 9, such that by actuating one of said crown gears (17) with respect to the other with a rotating movement, or both crown gears (17) with different rotating movements, a controlled rotation of the support (16), and therefore of the corresponding blade (13), is achieved, whereas by actuating both crown gears (17) with a synchronized rotational movement, the rotation of the blade (13) on the roller (14) of the cutting unit occurs.

In this way, by means of the combined movement of the crown gears (17) of the particular assembly of each blade (13), the individual orientation and positioning of each of the different blades (13) can be determined in order to make aligned cutting segments in a transverse or inclined direction, whereas the cuts are made with the synchronized rotation of the crown gears (17) of the corresponding blades (13), each blade (13) acting against the respective dolly roller (15.1).

Figure 13:
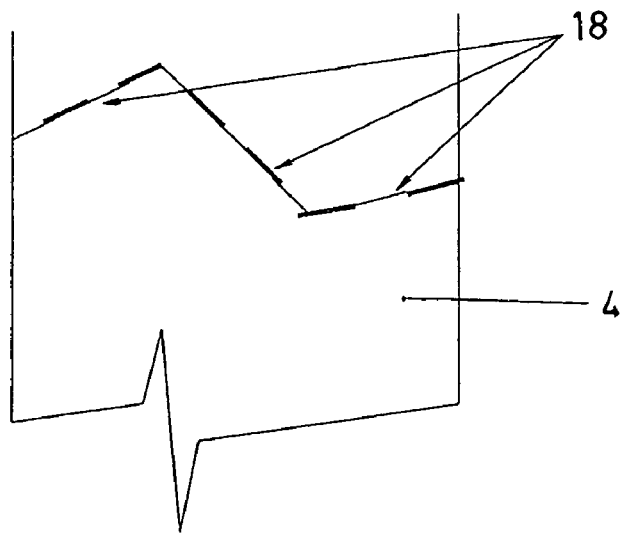
FIG. 13 shows an example of a transverse cut in inclined segments, with the differential cut of the orientable blades according to the invention.
Figure 14:
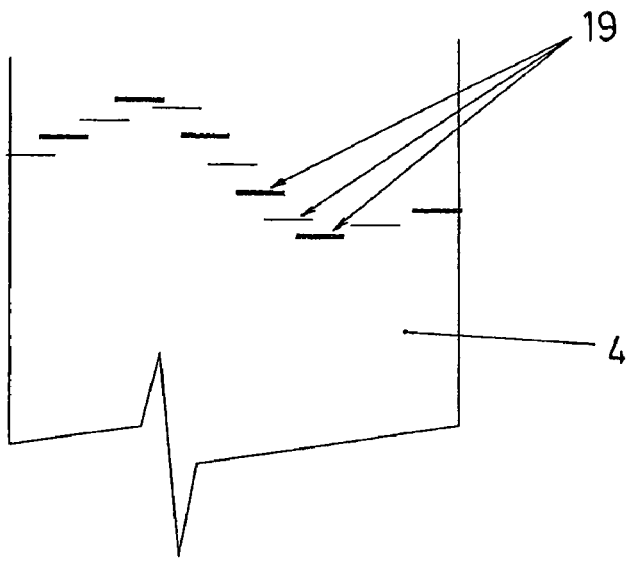
FIG. 14 is an example of the cut shape of previous figure with non-orientable blades.

The blades (13) of both units of the differential cutting systems, are arranged in a staggered positioning in relation to one another, with which the cuts made by the blades (13) of both units are overlapped in the longitudinal direction of said cuts, determining a continuous cutting line in the relevant cutting segments (18), as is observed in FIG. 13, unlike the alternate partial cuts (19) that would result, as shown in FIG. 14, if the blades (13) were not orientable.

As the blades (13) act against the corresponding dolly rollers (15.1), to make cuts at different angles the difficulty arises that the fit between each blade and its dolly must always be the same, regardless of the cutting angle, such that to solve that problem the blades (13) are provided with the front cutting edge in an arched shape, thus being able to fit in a corresponding manner with the ribbed profile of the dolly rollers (15.1) in any position for making the cuts.

By means of the differential cut described, only cutting inclinations of the order of 60 degrees can be reached, since for greater angles blades (13) that are wider than the space available between them would be required for the transverse cuts at 0° degrees.

Figure 7:
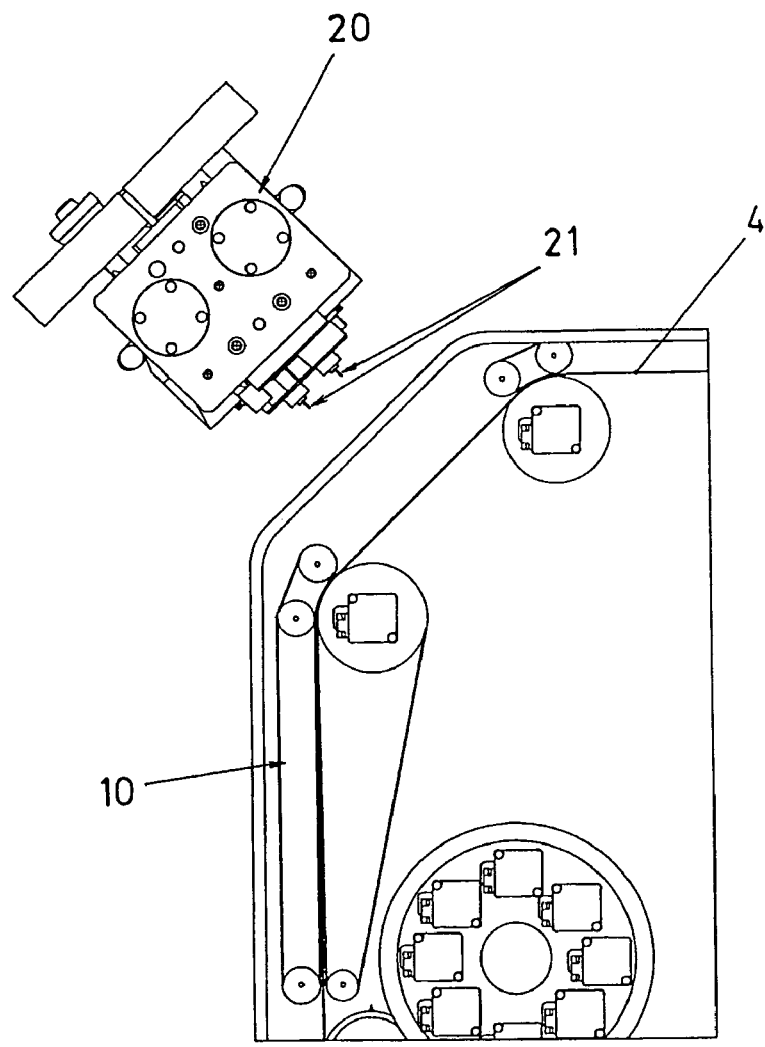
FIG. 7 is a detail of the area in which the longitudinal cutting module in the applicator head is located.

Therefore, in the path of the fibre strip (4) through the head, there is furthermore a longitudinal cutting module (20) which, (FIG. 7), consists of two blades (21) driven by means of ultrasound which can be moved laterally along the width of the passage area of the fibre strip (4), in order to make the necessary longitudinal cuts on said strip (4).

Figure 11:
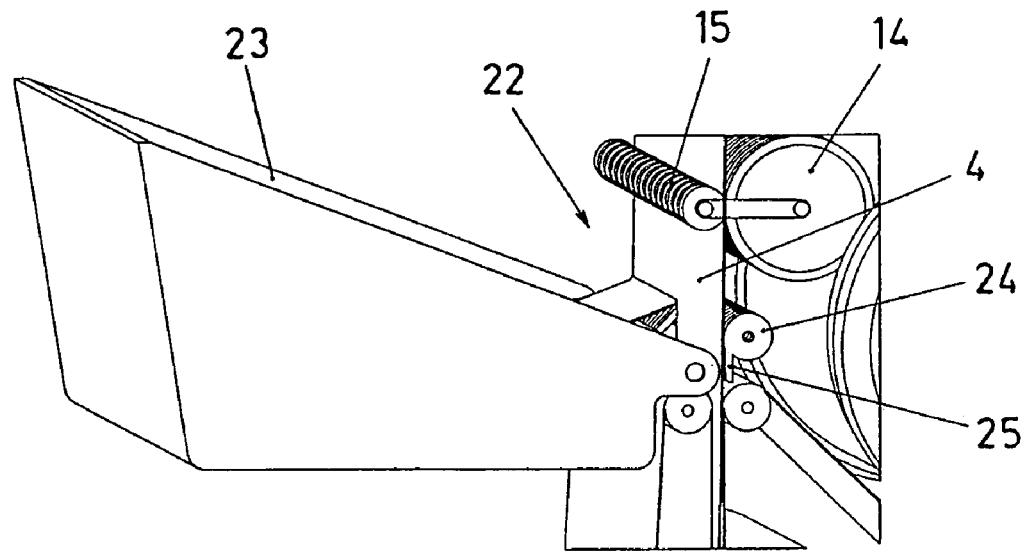
FIG. 11 is a perspective view of the waste separation module in the fibre strip applicator head according to the invention.
Figure 12:
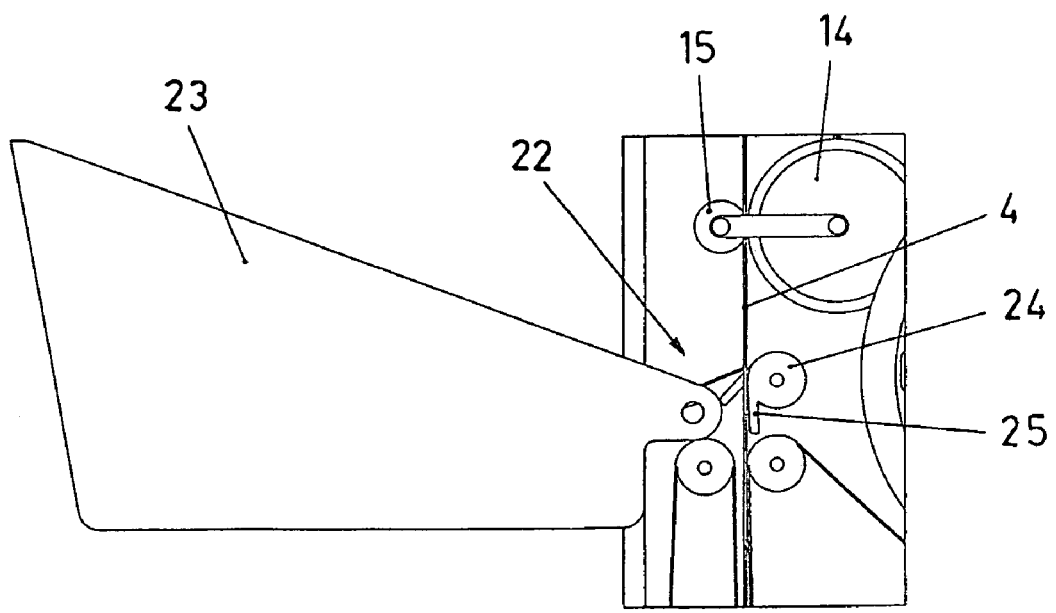
FIG. 12 is a side view of the waste separation module.

After the passage through the cutting areas, the fibre strip (4) passes through a waste separation module (22), which, as is observed in FIGS. 11 and 12, consists of a collecting box (23) and of a roller (24) provided with flanges (25) which can be individually positioned, interfering in the passage area of the fibre strip (4), or in a retracted position freeing up the passage of the strip (4), the movement of said flanges (25) being able to be actuated between the mentioned positions by any type of actuation, pneumatic, electric, mechanical actuation, etc.

In this way, by means of positioning the flanges (25), according to the established programming of cuts on the fibre strips (4), the deviation of the excess pieces of the strip towards the collecting box is determined in the actual passage of circulation of the strip (4), without needing complementary operations, and without having to reduce the speed of the application process.

The fibre strip (4) is applied on the surface to be formed by means of only one compacting roller (2), which exerts the necessary pressure, determining a system for separating the end of the application strip (4) with significant advantages with respect to the traditional heel/roller system, since:

- It allows selecting the use (waste or taping) of the different sections of the fibre strip (4), making it possible to continuously carry out the application taping of complex cuts without needing to prepare them previously, since the waste is eliminated and the application stripping is subsequently carried out.
- It does not require discarding or selecting the complete band, which allows taping very short fibre strips (4) on the surface of the application, conferring flexibility even with wide strips, as well as eliminating very short waste, reducing the percentage of discarded material.
- All the operations are carried out continuously and in a single step, with the consequent productivity advantage.
- The support paper (5) is not used in the transfer of the fibre strip (4) towards the application, whereby the fluctuations of adherence of the fibre material to said paper (5) do not affect the application taping.

The invention claimed is:

1. Improvements in fibre strip application heads, of the type intended for applying fibre strips that are supplied with a support and protection paper, characterized in that the fibre strip to be applied is supplied by unwinding from a feed reel, the support paper being immediately separated at the exit from the unwinding towards a take-up reel, whereas the fibre strip circulates by itself through the head towards an application area, passing through drive modules formed by caterpillar strips, with passage through a longitudinal cutting module and through a differential cutting system, as well as through a waste separation module eliminating the excess material remains in passage of the fibre strip towards the application area.

2. Improvements in fibre strip application heads according to claim 1, characterized in that the drive modules consist of caterpillar strips that are driven by drive rollers with a programmed speed and rotating freely above the programmed speed.

3. Improvements in fibre strip application heads according to claim 1, characterized in that the differential cutting system comprises two rotational cutting units acting consecutively, each of which consists of a roller provided with blades which can be oriented and positioned individually to make cuts in a transverse or inclined direction, the blades of both rotational cutting units being in a staggered arrangement in relation to one another in order to make between them longitudinally overlapping cuts to determine continuous cutting lines.

4. Improvements in fibre strip application heads according to claim 3, characterized in that each blade of the rotational cutting units is arranged on a support in the form of a bevel pinion gearing with two opposed bevel crown gears, such that by means of a different rotation drive of the two crown gears, an orientation rotation of the blade is obtained, whereas with the synchronized rotation of the two crown gears a rotation of the blade occurs on the bearing roller for making the cuts.

5. Improvements in fibre strip application heads according to claim 3, characterized in that the blades of the rotational cutting units have an arched cut front edge, in relation to corresponding ribbed dolly rollers, allowing making uniform incisions in inclined cuts.

6. Improvements in fibre strip application heads according to claim 4, characterized in that the blades of the rotational cutting units have an arched cut front edge, in relation to corresponding ribbed dolly rollers, allowing making uniform incisions in inclined cuts.

7. Improvements in fibre strip application heads according to claim 1, characterized in that the waste separation module consists of a roller provided with flanges which can be independently located in an interference position with respect to the passage of the fibre strip, to deviate the disposable pieces of material towards a collecting box when the fibre strip passes towards the application.

* * * * *